(12) United States Patent
Yu et al.

(10) Patent No.: US 9,871,261 B2
(45) Date of Patent: Jan. 16, 2018

(54) FUEL CELL STACK ENCLOSURE

(71) Applicants: HYUNDAI MOTOR COMPANY, Seoul (KR); Wooshin Industrial Co., Ltd., Dangjin-si, Chungcheongnam-do (KR)

(72) Inventors: Jung Han Yu, Yongin-si (KR); Young Woo Noh, Guri-si (KR); Jung Do Suh, Seoul (KR); Duck Whan Kim, Seongnam-si (KR); Young Bum Kum, Seoul (KR); Chang Jun Lee, Hwaseong-si (KR); Tae Min Lee, Seoul (KR); Yong Woo Choi, Ansan-si (KR)

(73) Assignees: HYUNDAI MOTOR COMPANY, Seoul (KR); WOOSHIN INDUSTRIAL CO., LTD., Dangjin, Chungcheongnam-do (KR)

( * ) Notice: Subject to any disclaimer, the term of this patent is extended or adjusted under 35 U.S.C. 154(b) by 76 days.

(21) Appl. No.: 15/160,106

(22) Filed: May 20, 2016

(65) Prior Publication Data
US 2017/0170498 A1 Jun. 15, 2017

(30) Foreign Application Priority Data
Dec. 9, 2015 (KR) .......... 10-2015-0174944

(51) Int. Cl.
*H01M 8/24* (2016.01)
*H01M 8/04291* (2016.01)
*H01M 8/2465* (2016.01)

(52) U.S. Cl.
CPC ..... *H01M 8/04291* (2013.01); *H01M 8/2465* (2013.01)

(58) Field of Classification Search
CPC .......... H01M 8/04291; H01M 8/2465
See application file for complete search history.

(56) References Cited

U.S. PATENT DOCUMENTS

| 6,329,093 | B1 * | 12/2001 | Ohara | H01M 8/0247 |
| | | | | 429/437 |
| 2015/0008353 | A1 * | 1/2015 | Kiku | F16K 7/12 |
| | | | | 251/331 |

FOREIGN PATENT DOCUMENTS

| JP | 2004-311222 A | 11/2004 |
| JP | 2006-127944 A | 5/2006 |
| JP | 2007-042490 A | 2/2007 |
| JP | 2007105458 A | 4/2007 |
| JP | 2008-084564 A | 4/2008 |
| KR | 10-2012-0116747 A | 10/2012 |
| KR | 10-2013-0083203 A | 7/2013 |
| KR | 10-1526421 B1 | 6/2015 |

OTHER PUBLICATIONS

Korean Office Action issued in Application No. 10-2015-0174944 dated Aug. 17, 2017.

* cited by examiner

*Primary Examiner* — Stewart A Fraser
(74) *Attorney, Agent, or Firm* — McDermott Will & Emery LLP

(57) ABSTRACT

A fuel cell stack enclosure includes: a lower housing disposed under a fuel cell stack and having a bottom plate portion provided with a water outlet therein; a sealing cap closing the water outlet from an outside of the lower housing; and an elastic member elastically pulling the sealing cap toward the bottom plate portion of the lower housing.

11 Claims, 4 Drawing Sheets

FUEL CELL STACK ENCLOSURE

CROSS REFERENCE TO RELATED APPLICATION

The present application claims the benefit of priority to Korean Patent Application No. 10-2015-0174944, filed on Dec. 9, 2015, the entire content of which is incorporated herein for all purposes by this reference.

TECHNICAL FIELD

The present disclosure relates to a fuel cell stack enclosure, and more particularly, to a fuel cell stack enclosure having a sealing structure to prevent a fuel cell stack disposed in the fuel cell stack enclosure from coming into contact with external air and having a watertight structure to maintain optimum operation performance of the fuel cell stack.

BACKGROUND

A fuel cell system is a power generation system that directly converts chemical energy of fuel into electricity. A fuel cell system includes: a fuel cell stack that generates electricity; a fuel supply unit that supplies the fuel cell stack with fuel (i.e. hydrogen); an air supply unit that supplies the fuel cell stack with air (i.e. oxygen) serving as oxidant which causes an electrochemical reaction; and a heat-and-water management unit that discharges heat out of the fuel cell stack and controls the operation temperature of the fuel cell stack. The fuel cell stack produces electricity through an electrochemical reaction between hydrogen (fuel) and oxygen (air) and also generates byproducts (heat and water) that need to be discharged out of the fuel cell stack.

A fuel cell stack that is suitably used for a fuel cell vehicle includes many single cells arranged in a row. Each single cell includes a membrane-electrode assembly (MEA) disposed in the center. The MEA includes an electrolyte membrane that allows protons to pass therethrough. Catalyst layers serving as a cathode and an anode at which hydrogen and oxygen react with each other are provided on respective surfaces of the electrolyte membrane. Gas diffusion layers (GDL) are disposed on the surfaces of the catalyst layers. Separators with respective flow fields (channels) through which fuel and air are supplied to the anode and the cathode are disposed on the surfaces of the GDLs. End plates are disposed at respective ends of a single cell to firmly combine the all elements.

In the fuel cell stack, hydrogen and oxygen are ionized through chemical reactions by catalyst layers. Then, an oxidation reaction occurs to generate protons (hydrogen ions) and electrons at a fuel electrode to which hydrogen is supplied. A reduction reaction involving hydrogen ions and oxygen ions occurs to produce water at an air electrode to which air is supplied. A typical electrode catalyst that is used for a fuel cell is composed of a catalyst support made from a carbon material and a cocatalyst such as Ru, Co, Cu, or the like. Hydrogen is supplied to an anode (also referred to as "oxidation electrode") and oxygen (air) is supplied to a cathode (also referred to as "reduction electrode"). Hydrogen supplied to the anode is split into protons $H^+$ and electrons $e^-$ by catalysts on electrode layers disposed on respective surfaces of the electrolyte membrane. Of the protons and electrons, only protons can selectively pass through an electrolyte membrane called a proton exchange membrane and can reach a cathode, and electrons move through the GDLs (conductive layers) and separators to reach the cathode.

Hydrogen ions and electrons that reach the cathode through the electrolyte membrane and separators combine with oxygen contained in air that is supplied to the cathode by an air supply unit, thereby producing water. At this point, movement of hydrogen ions induces an electric current that flows along an external wire. At this point, aside from water, heat is also concomitantly produced as a byproduct.

Typically, an enclosure houses and seals a fuel cell stack that provides a high voltage to physically protect the fuel cell stack. In this case, water may be produced in the enclosure due to condensation that is attributable to a difference in temperature between an inside and an outside of the enclosure. Furthermore, water that is produced by a fuel cell stack disposed in the enclosure may gather in the enclosure. Therefore, an effective means for discharging water that is produced by a fuel cell stack as well as water that is generated due to condensation is needed.

Conventionally, a water outlet for discharging water is formed in a lower housing of an enclosure as the means for discharging water out of the enclosure. The conventional water-discharging means has a problem that it may allow contaminants to enter the enclosure, which often leads to malfunctioning of a fuel cell stack disposed in the enclosure. Furthermore, as for conventional enclosures, water removal efficiency is dependent on the position, size, and number of water outlets. That is, as the number of water outlets increases, the water removal effect is improved but sealing performance is deteriorated.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a fuel cell stack enclosure having a sealing structure that cuts off contact with external air to prevent impurities or contaminants from intruding into a fuel cell stack and having a watertight structure to maintain optimum operation performance of a fuel cell stack disposed in the fuel cell stack enclosure.

According to one embodiment in the present disclosure, a fuel cell stack enclosure includes a lower housing disposed under a fuel cell stack and having a bottom plate portion with a water outlet therein; a sealing cap closing the water outlet from an outside of the lower housing; and an elastic member elastically pulling the sealing cap toward the bottom plate portion of the lower housing.

In the fuel cell stack enclosure, a periphery portion of a lower portion of the lower housing may taper to a lower end thereof so that the lower housing has an inclined portion that slopes down from the periphery portion of the lower housing, and an end of the bottom plate portion may be connected to an end of the inclined portion.

The inclined portion and the bottom plate portion may be connected to form a storage space thereon to store water that is collected in the fuel cell stack enclosure.

The elastic member may be extended to push the sealing cap downward when a weight of water stored in the storage space reaches or exceeds a predetermined value, and thus, the sealing cap is opened so that the stored water is discharged out of the fuel cell stack enclosure.

The fuel cell stack enclosure may further include a dehydration member disposed between the fuel cell stack and the bottom plate portion of the lower housing.

The fuel cell stack enclosure may further include a filter member disposed between the fuel cell stack and the bottom plate portion of the lower housing.

The fuel cell stack enclosure may further include a dehydration member disposed between the filter member and the bottom plate portion of the lower housing.

The filter member may be a porous film, unwoven cloth, or paper.

The water outlet may have a cylindrical shape and extend from a lower surface of the bottom plate portion of the lower hosing.

The elastic member may include: a flat portion having a larger size than the water outlet; and a protrusion extending from the flat portion to an inside of the water outlet so that a side surface of the protrusion faces an inner surface of the water outlet.

According to another embodiment in the present disclosure, a fuel cell stack enclosure includes a lower housing disposed under a fuel cell stack and having a bottom plate portion provided with a water outlet formed therein; a sealing cap closing the water outlet from an outside of the lower housing; an elastic member elastically pulling the sealing cap toward the bottom plate portion of the lower housing; a filter member disposed between the fuel cell stack and the bottom plate portion of the lower housing; and a dehydration member disposed between the filter member and the bottom plate portion of the lower housing. The elastic member extends to push the sealing cap down by water so that the water is discharged out of the fuel cell stack enclosure when a weight of the water stored in the lower housing reaches or exceeds a reference value.

The fuel cell stack enclosure according to the present disclosure can discharge water, without using electric power or external driving force, which leads to a simplified fuel cell system. In addition, since discharging of water can be performed even when a vehicle is parked, problems attributable to water can be dramatically reduced.

In addition, since a predetermined degree of dryness is maintained in various operation states of a fuel cell stack due to the presence of a dehydration member disposed in a fuel cell stack enclosure as well as since a sealed state of a fuel cell stack enclosure is maintained by a sealing cap, the fuel cell stack enclosure can protect a fuel cell stack from external impurities or contaminants under a normal state in which water is not present in the fuel cell stack enclosure.

DETAILED DESCRIPTION

Hereinafter, fuel cell stack enclosures according to embodiments in the present disclosure will be described with reference to the accompanying drawings.

Figure 1:
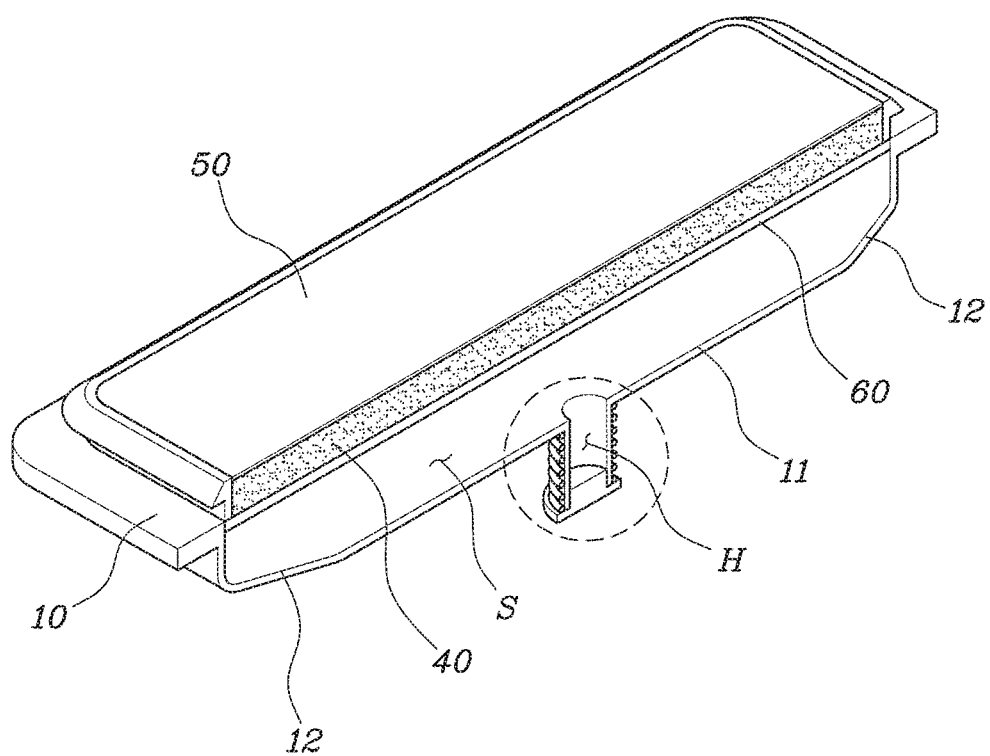
FIG. 1 is a perspective cross-sectional view of a lower housing of a fuel cell stack enclosure according to one embodiment in the present disclosure.
Figure 2:
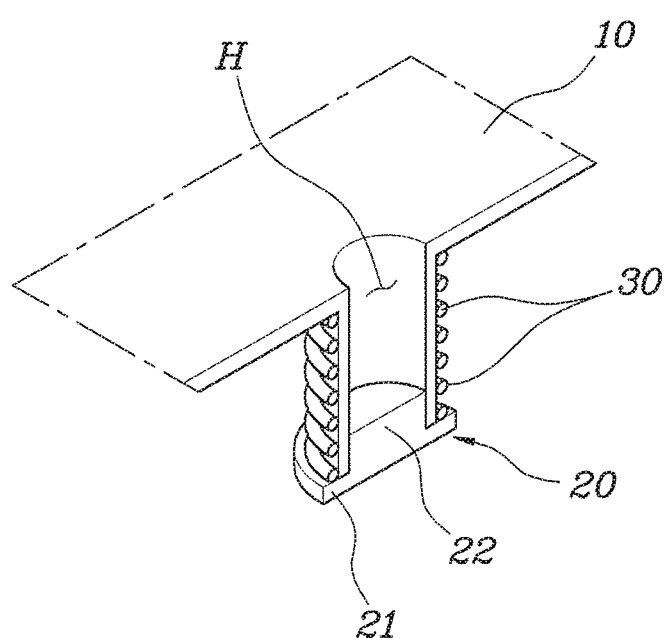
FIG. 2 is an enlarged view illustrating a water outlet formed in the lower housing of the fuel cell stack enclosure according to the embodiment in the present disclosure.

FIG. 1 is a perspective cross-sectional view of a lower housing of a fuel cell stack enclosure according to one embodiment in the present disclosure; FIG. 2 is an enlarged view illustrating a water outlet formed in the lower housing of the fuel cell stack enclosure according to the embodiment in the present disclosure; and FIG. 3 is a cross-sectional view illustrating the fuel cell stack enclosure according to the embodiment in the present disclosure.

Figure 3:
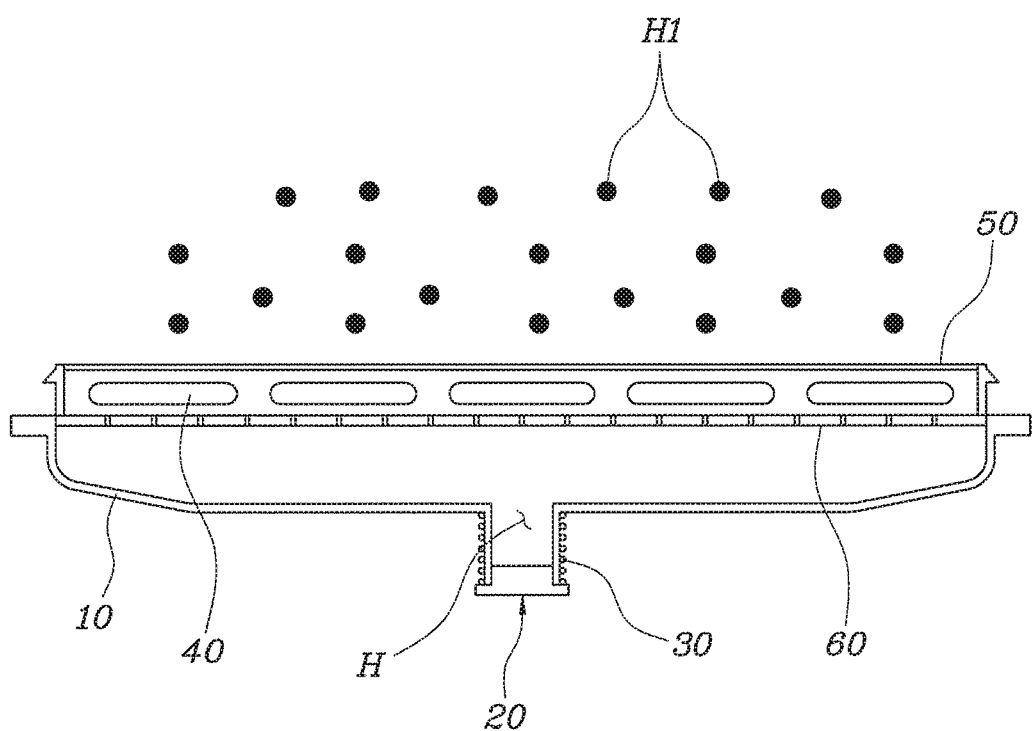
FIG. 3 is a cross-sectional view illustrating the fuel cell stack enclosure according to the embodiment in the present disclosure.

With reference to FIGS. 1 to 3, a fuel cell stack enclosure 1 according to the present disclosure includes a lower housing 10, a sealing cap 20, and an elastic member 30.

The lower housing 10 is a lower part of the fuel cell stack enclosure. The lower housing 10 is combined with a side housing and an upper housing to form a sealed space to accommodate a fuel cell stack therein. A fuel cell stack is disposed in the lower housing 10.

According to one embodiment in the present disclosure, a lower portion of the lower housing 10 includes: a flat portion 11 (hereinafter, referred to as bottom plate portion) disposed at the center; and an inclined portion 12 disposed at the periphery portion of the lower housing 10. The bottom plate portion 11 is provided with a water outlet H. Water generated in the fuel cell stack enclosure 1 is stored on a top surface of the bottom plate portion 11, i.e., in a space formed between the fuel cell stack and the bottom plate portion 11 and then discharged out of the fuel cell stack enclosure 1 through the water outlet H when a specific condition is satisfied. The water discharging process will be described later.

A periphery portion of a lower portion of the lower housing 10 is tapered to a lower end thereof. That is, the lower housing 10 has the inclined portion 12 that is sloped down from the periphery portion of the lower housing 10. An end of the inclined portion 12 is connected to an end of the bottom plate portion 11. The inclined portion 12 and the bottom plate portion 11 form a storage space S thereon to store water generated in the fuel cell stack enclosure 1. Due to the inclined portion 12, water may easily flow down to the water outlet H along the inclined inside surface of the fuel cell stack enclosure 1, and thus can be easily discharged through the water outlet H. That is, the inclined portion of the lower housing facilitates discharging of water.

The sealing cap 20 is arranged to close the water outlet H from the outside of the lower housing 10. The sealing cap 20 may be made from rubber or silicone having elasticity in order to guarantee secure sealing of the inside of the fuel cell stack enclosure 1 by closing the water outlet H when water is not present in the fuel cell stack enclosure 1. In addition, to achieve a secure sealing state, the sealing cap 20 includes a flat portion 21 having a larger size than the water outlet H and a protrusion 22 extending from a top surface of the flat portion 21 and having a side surface that faces an inside surface of the water outlet H when the protrusion 22 is inserted into the water outlet H.

To increase the sealing effect of the sealing cap 20, the water outlet H may have a cylindrical shape extending down from the bottom surface of the bottom plate portion 11, and the sealing cap 20 may be arranged at an end portion of a cylinder serving as the water outlet H.

A first end of the elastic member 30 is coupled to a lower portion of the bottom plate portion 11 and a second end (remaining end) of the elastic member 30 is coupled to the sealing cap 20, thereby elastically holding the sealing cap 20. According to the present disclosure, the fuel cell stack enclosure 1 needs to maintain a sealed state except for a period during which water is being discharged out of it. Therefore, the elastic member 30 elastically pulls the sealing cap 30 toward the bottom plate portion of the lower housing of the fuel cell stack enclosure 1.

The elastic member 30 may be a coil spring. When the water outlet H has a cylindrical shape extending downward from the bottom surface of the bottom plate portion of the lower housing, the coil spring is arranged to surround the cylindrical water outlet H.

Figure 4:
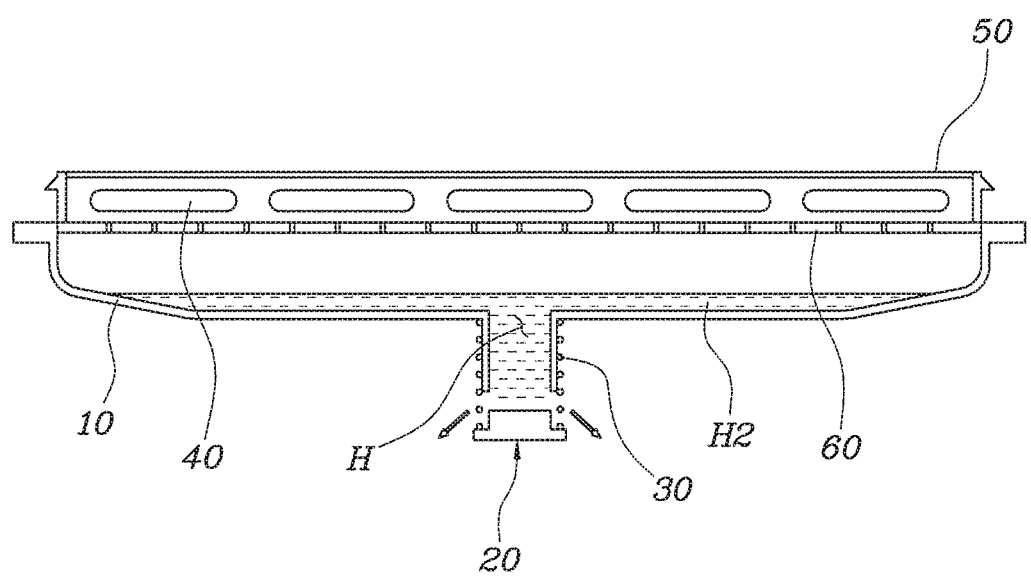
FIG. 4 is a cross-sectional view illustrating a state in which water is being discharged out of the fuel cell stack enclosure according to the embodiment in the present disclosure.

FIG. 4 is a cross-sectional view illustrating a state in which water is being discharged out of the fuel cell stack enclosure 1 according to one embodiment in the present disclosure.

According to the present disclosure, when water is generated in the fuel cell stack enclosure 1, the water may be collected on the top surface of the bottom plate portion 11 of the lower housing 10 by gravity. When the weight of the collected water reaches or exceeds a predetermined value that is determined according to a spring constant of a coil spring serving as the elastic member, the spring 30 extends downward to push down the sealing cap 20 so that the water outlet H is opened. Therefore, as illustrated in FIG. 4, the collected water W2 can be discharged out of the fuel cell stack enclosure 1. After the water is completely discharged, the sealing cap 20 is returned to close the water outlet H due to elastic restoring force of the elastic member 30.

According to the present disclosure, the fuel cell stack enclosure 1 may further include a dehydration member 40 and a filter member 50. According to FIGS. 1 to 3, the fuel cell stack enclosure 1 includes both the dehydration member 40 and the filter member 50. However, alternatively, a fuel cell stack enclosure 1 according to the present disclosure may include only either one of the dehydration member 40 and the filter member 50.

The dehydration member 40 and/or the filter member 50 may be disposed between a fuel cell stack and the bottom plate portion 11 of the lower housing. In the case in which the fuel cell stack enclosure 1 includes both of the dehydration member 40 and the filter member 50, the filter member 50 may be disposed between the fuel cell stack and the dehydration member 40.

The dehydration member 40 absorbs water or moisture generated in the fuel cell stack enclosure 1, thereby dehydrating the inside space of the fuel cell stack enclosure 1. The dehydration member 40 may have a composition including Bentonite clay, calcium chloride ($CaCl$), or sodium hydroxide ($NaOH$) that are all deliquescent substances. The fuel cell stack enclosure 1 according to the present disclosure may include a dehydration agent-supporting plate 60 that is a porous plate and supports the dehydration member 40 thereon.

The dehydration member 40 absorbs moisture or water generated within the fuel cell stack enclosure 1. However, when the amount of moisture or water generated in the fuel cell stack enclosure 1 exceeds water-absorbing capacity of the dehydration member 40, or when the dehydration member 40 excessively absorbs the amount of water that exceeds the water-absorbing capacity thereof, the absorbed water may form a water pool on the top surface of the bottom plate portion 11 of the lower housing 10 and is thus stored in the fuel cell stack enclosure 1. When the amount of water stored on the bottom plate portion 11 of the lower housing 10 reaches or exceeds a predetermined amount, the elastic member (spring) 30 extends as described above and the sealing cap 20 moves down to open the water outlet H. As a result, the stored water can be discharged out of the fuel cell stack enclosure 1.

The filter member 50 functions to prevent water, which is contained in the underlying dehydration member 40 or stored on the bottom plate portion 11, from wetting a fuel cell stack that is arranged thereon.

The filter member 50 may be made from a porous film, unwoven cloth or paper all of which are made of polytetrafluoroethylene (PTFE).

The PTFE-based porous film has micro-size pores, thereby allowing air and/or vapor to pass through but not allowing liquid phase water or dust to pass through. When a fuel cell stack operates, that is, when the humidity in the fuel cell stack enclosure 1 increases, moisture W1 of a gas phase passes through the PTFE-based porous film and is then absorbed by the dehydration member 50.

The unwoven cloth or paper also has micro-size pores as the PTFE-based porous film. This unwoven cloth or porous paper allows air or vapor to pass through but does not allow dust to pass through. The unwoven cloth or paper has the ability to absorb moisture or liquid phase water. The unwoven cloth or porous paper has almost the same effect as the PTFE-based porous film in terms that it allows air or vapor to pass through. In addition, when moisture or liquid phase water is collected on the top surface of the unwoven cloth or porous paper, it allows the water to pass through itself in the direction of gravity. Moisture or liquid phase water that passes through the filter member made from unwoven cloth or porous paper meets the dehydration member 40 and is then collected in the water outlet H.

When moisture or vapor phase water increases in the fuel cell stack enclosure 1 in a state in which a fuel cell stack is operating or not operating, humidity in the fuel cell stack enclosure 1 is managed by the filter member made from a PTFE-based porous film. On the other hand, when moisture or liquid phase water is increased in the fuel cell stack enclosure 1, the humidity in the fuel cell stack enclosure 1 is managed such that the moisture or water is absorbed by the filter member made from unwoven cloth or paper and is finally collected in the water outlet H.

As described above, the fuel cell stack enclosure according to the present disclosure can discharge water without using electric power or driving force, which leads to a simplified system. In addition, since water discharging is performed even when a vehicle is parked, problems attributable to water are dramatically decreased.

Specifically, the fuel cell stack enclosure according to the present disclosure can maintain a predetermined degree of dryness in various operation states of a fuel cell stack with use of the dehydration member. Furthermore, since the sealing state of the fuel cell stack enclosure is maintained by the sealing cap in a normal state in which water is not present in the fuel cell stack enclosure, it is possible to effectively protect a fuel cell stack from impurities or contaminants.

Although an exemplary embodiment in the present disclosure has been described for illustrative purposes, those skilled in the art will appreciate that various modifications, additions, and substitutions are possible, without departing from the scope and spirit of the invention as disclosed in the accompanying claims.

What is claimed is:

1. A fuel cell stack enclosure, comprising:
 a lower housing disposed under a fuel cell stack and having a bottom plate portion with a water outlet therein;

a sealing cap closing the water outlet from an outside of the lower housing; and an elastic member elastically pulling the sealing cap toward the bottom plate portion of the lower housing.

2. The fuel cell stack enclosure according to claim 1, wherein since a periphery portion of a lower portion of the lower housing tapers to a lower end thereof, the lower housing has an inclined portion that slopes down from the periphery portion of the lower housing and an end of the bottom plate portion is connected to an end of the inclined portion.

3. The fuel cell stack enclosure according to claim 2, wherein the inclined portion and the bottom plate portion are connected to form a storage space thereon to store water that is collected in the fuel cell stack enclosure.

4. The fuel cell stack enclosure according to claim 3, wherein the elastic member extends to push the sealing cap downward when a weight of water stored in the storage space reaches or exceeds a reference value, and thus, the sealing cap is opened so that the stored water is discharged out of the fuel cell stack enclosure.

5. The fuel cell stack enclosure according to claim 1, further comprising:
a dehydration member disposed between the fuel cell stack and the bottom plate portion of the lower housing.

6. The fuel cell stack enclosure according to claim 1, further comprising:
a filter member disposed between the fuel cell stack and the bottom plate portion of the lower housing.

7. The fuel cell stack enclosure according to claim 6, further comprising:
a dehydration member disposed between the filter member and the bottom plate portion of the lower housing.

8. The fuel cell stack enclosure according to claim 6, wherein the filter member is a porous film, unwoven cloth, or paper.

9. The fuel cell stack enclosure according to claim 1, wherein the water outlet has a cylindrical shape and extends from a lower surface of the bottom plate portion of the lower housing.

10. The fuel cell stack enclosure according to claim 1, wherein the elastic member includes:
a flat portion having a larger diameter than that of the water outlet; and
a protrusion extending from the flat portion to an inside of the water outlet so that a side surface of the protrusion faces an inner surface of the water outlet.

11. A fuel cell stack enclosure, comprising:
a lower housing disposed under a fuel cell stack and having a bottom plate portion provided with a water outlet formed therein;
a sealing cap closing the water outlet from an outside of the lower housing;
an elastic member elastically pulling the sealing cap toward the bottom plate portion of the lower housing;
a filter member disposed between the fuel cell stack and the bottom plate portion of the lower housing; and
a dehydration member disposed between the filter member and the bottom plate portion of the lower housing,
wherein the elastic member extends to push the sealing cap down by water so that the water is discharged out of the fuel cell stack enclosure when a weight of the water stored in the lower housing reaches or exceeds a reference value.

* * * * *